July 8, 1930.   F. W. GAY   1,770,073
APPARATUS FOR EXCITING ALTERNATING CURRENT MACHINES
Filed Jan. 19, 1929
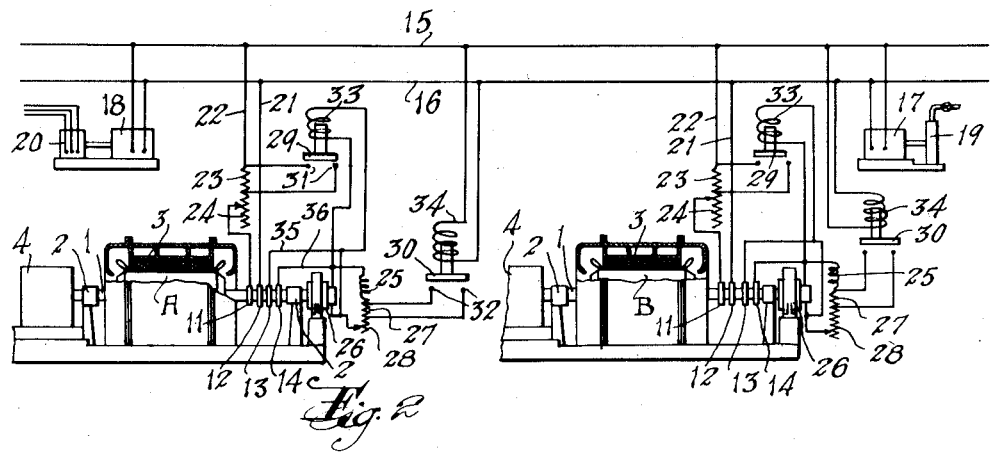
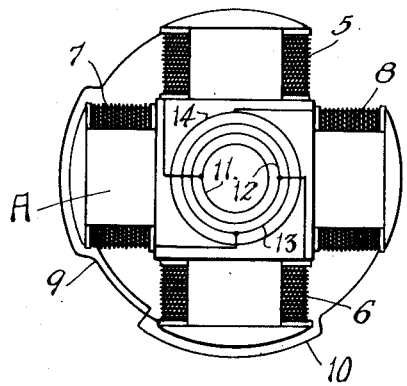
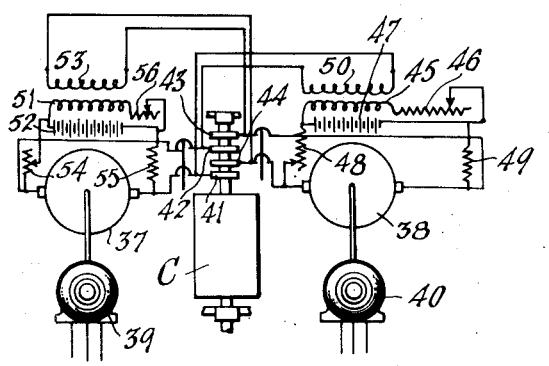
INVENTOR
Frazer H. Gay,
BY
Everett Cook,
ATTORNEYS Patented July 8, 1930

1,770,073

UNITED STATES PATENT OFFICE

FRAZER W. GAY, OF NEWARK, NEW JERSEY

APPARATUS FOR EXCITING ALTERNATING-CURRENT MACHINES

Application filed January 19, 1929. Serial No. 333,653.

This invention relates particularly to the excitation of alternating electric current generators, for example turbo-generators, one object of the invention being to provide a novel and improved exciting mechanism whereby may be obviated interruption of operation of the generator or the exciter by a single short circuit, open circuit or ground in the field of the generator or in the exciter. As is known to those skilled in the art, turbo-generators are generally excited by direct current generators coupled directly to the shaft of the turbo-generator, an auxiliary circuit also being provided to which the turbo-generator field may be switched in case of failure of the exciter coupled to the turbo-generator shaft. With this arrangement a single short circuit or open circuit within or outside the generator field circuit will usually cause the machine to "pull out of step" and sometimes seriously interfere with the stability of the whole generating system, and even when the fault can be immediately remedied, some portion of the service may be interrupted during the time that is required in re-synchronizing the affected generator. Also if the field becomes grounded, most operators will cut the machine out of service, since the occurrence of another ground on the exciter system would be likely to cause such a severe unbalanced magnetic pull that the machine would be seriously damaged before it could be shut down.

While the use of the direct connected exciters, that is, exciters connected to the shaft of the turbo-generator, is to be recommended on machines wherever practical, and such a system gives a degree of reliability that cannot be approached by any other economical system, yet certain new conditions in the art are gradually rendering the adoption of this direct connected exciter system impossible or inadvisable. For example, it is well known that the reliability of 1800 R. P. M. direct current machines diminishes rapidly as the capacity is increased beyond 250 k. w., and such machines are not well adapted to run at 3600 R. P. M. in any size. The present tendency is toward large 1800 R. P. M. turbo-generators in capacity approaching 100,000 k. v. a.; and as these large 1800 R. P. M. machines require excitation well above 250 k. w. a single shaft end exciter is not desirable. Furthermore, in many of the newer installations where high pressure steam is used, there are found a plurality of 3600 R. P. M. high pressure turbo-generators of relatively small capacity and several 1800 R. P. M. generators of relatively large capacity, on none of which direct connected exciters can be operated without undue complications.

As above stated, in every important power station there are usually two separate sources of excitation for each machine. One type of excitation apparatus comprises a single exciter bus for all of the machines of a given station to which all of the machines are connected, whereby the voltage output of the station, and thereby the whole system, can be rapidly and conveniently adjusted either by hand or by automatic regulators. The objection to this type of apparatus is that it entails too much risk due to the complete shutting down of the station, and if heavily loaded the entire system, in case of power failure on the exciter bus. The other type of exciting apparatus is the individual shaft end or direct connected exciter for each machine, above-mentioned, which is more reliable than the common exciter bus type. Both types have desirable features and accordingly another object of my invention is to provide exciting mechanism of the general character described embodying novel and improved features whereby the advantages of a single station exciter bus common to all machines, may be combined with the advantages of the individual shaft end exciter so that the desirable results of the common station exciter bus, such as adjustment of the voltage of the station and system, can be had with even greater safety of operation and reliability of service than is now possible with the use of the direct connected shaft end exciter.

In obtaining this result, I contemplate providing each turbo-generator rotor with two separately insulated field windings each of which is excited by one of duplicate sources of excitation, each winding when singly excited being capable of operating the generator at approximately unity power factor, while the two windings when simultaneously excited are capable of operating the generator at its rated power factor, of for example 80%, whereby a short circuit or open circuit on any exciter bus, or on any single generator field, will not disturb or unload the generator, the only effect of such a short circuit or open circuit being to change the power factor of the machine.

Other objects of the invention are to provide an electric power generating system comprising a plurality of generators each having two separately insulated field windings one of which is connected to a common exciter bus while the other is connected to a different and separately insulated source of excitation which may consist of a second exciter bus common to several machines, or an individual shaft end exciter; to provide means for automatically strengthening one of the generator field windings upon failure of voltage on the other winding, and to obtain other advantages and results as will be brought out by the following description.

Referring to the accompanying drawings, in which corresponding and like parts are designated throughout the several views by the same reference characters, Figure 1 is a schematic sectional end elevation of the rotor of a turbo-generator embodying my invention.

Figure 2 is a schematic illustration of a power system including my exciting apparatus, and Figure 3 is a similar view showing a modified form of the invention.

Specifically describing the embodiment of the invention illustrated in Figures 1 and 2 of the drawings, the reference characters A and B designate two identical generator rotors each mounted on a shaft 1 journalled in bearings 2 to rotate within a stator 3 of known construction. The rotors A and B are shown as driven by turbines 4. The output sides of the generators are not shown since they constitute no part of the present invention. Each generator rotor A and B has two separately insulated field windings and each winding includes two sections arranged in diametrically opposite relation, one winding including the sections 5 and 6, and the other winding including the sections 7 and 8. The sections 5 and 6 are electrically connected by the wire 9, while the sections 7 and 8 are connected by the wire 10. The field winding 5, 6 is connected across slip rings 11 and 12, while the other field winding 7, 8 is connected across the slip rings 13 and 14. The magneto-motive forces of the two windings 5, 6 and 7, 8 thus are additive numerically.

Station exciter busses 15 and 16 are supplied with direct current from exciters 17 and 18, which are shown as driven by a steam turbine 19 and an electric motor 20, respectively. The winding 5, 6 is supplied with direct current from the exciter busses 15 and 16 through lead wires 21 and 22 which are connected to the respective slip rings 11 and 12. Connected in series in the lead wire 22 is a resistor having a section 23 of fixed resistance and a section 24 in which resistance is adjustable.

An exciter 26 is direct connected to the end of the generator shaft 1 and has connected in series with its field 25, a resistor having a portion 27 of fixed resistance and another portion 28 of variable resistance. Across the fixed resistor sections 23 and 27 are shunted the relay contact arms 29 and 30, respectively, which cooperate with the respective pairs of contacts 31 and 32. The relay contact arms 29 and 30 are actuated by the respective coils 33 and 34, the first of which is connected in shunt with the exciter 26 while the latter is connected across the exciter busses 15, 16. Direct current is supplied to the generator field 7, 8 by the shaft end exciter 26 through lead wires 35 and 36.

In operation of the system approximately one half of the excitation required by each generator A and B is absorbed by the field winding 5, 6, and this excitation is supplied by the exciters 17 and 18 through the busses 15 and 16, leads 21 and 22 and slip rings 11 and 12. The other half of the exciting current required by each generator is supplied by the armature of the exciter 26 through the leads 35 and 36 and slip rings 13 and 14 to the field windings 7, 8. If a short circuit should occur on the busses 15, 16, so that exciters 17 and 18 must be shut down, the voltage on the busses 15, 16 will fall at the instant of short circuit and the relay 34 will actuate its contact arm 30 so as to short-circuit the fixed resistance section 27 and thereby raise the voltage on the armature of the exciter 26. This will cause a corresponding rise in voltage on the field winding 7, 8 of the generator. This field supplied by the exciter 26 will be sufficient to hold the generator A in synchronism until the voltage of the armature of the exciter 26 builds up and increases the voltage on the field of the generator A to a satisfactory operating value. Should trouble arise in the shaft end exciter 26 and make it necessary to take off the voltage from its armature, the relay 33 will operate to cut out the fixed resistance 23 and increase the voltage of the exciting current supplied from the busses 15 and 16 to the field windings 5, 6 of the generator, whereupon operation of the generator will continue at full load but at another power factor, just as when a short circuit occurs on the busses 15, 16 above described.

Obviously a voltage regulator of known type may be used with the exciters 17 and 18 or the shaft end exciters 26.

From the foregoing it will be observed that no interruption of operation of either generator of the system including the plurality of generators, is caused by a short circuit or an open circuit, each field winding of each generator serving singly to carry the full load of the generator when the other winding is put out of operation. This is due to the duplication of the excitation in the generator field by the use of the two field windings each of which is excited by a separate source of excitation, in combination with the resistors and relays for strengthening the field of the winding which is unaffected by the short circuit or the like.

In Figure 3 I have shown a modification of my invention applied to an alternator C. The rotor of this alternator has the two separately insulated field windings like the rotors A and B hereinbefore described, and the field windings are separately excited by two independent exciters 37 and 38 which are driven by the respective motors 39 and 40. The exciter 37 is shown connected to slip rings 41 and 42, while the exciter 38 is connected to slip rings 43 and 44. The two sets of rings are shown as alternately arranged in this form of the invention so as to render harmless accidental contact of adjacent rings.

The exciter 38 has a main exciter field 45 which is connected through a resistor 46 to a low voltage battery 47 which is in shunt with the armature of the exciter 38 through resistors 48 and 49. These resistors 48 and 49 are adjusted so that at normal exciter voltage they pass enough current to supply the field 38 in such a manner that the battery 47 floats on the field and only functions to furnish the excitation in case of a momentary drop in the voltage of the exciter 35 due to a system disturbance or similar trouble. A second weaker shunt field 50 is connected across the slip rings 41 and 42 and normally acts differentially with respect to the field 45. It will therefore be evident that a failure of voltage on the field of the alternator C supplied through the rings 41 and 42, will offset or neutralize the differential field 50 and allow field 45 to raise the voltage on the exciter 38 and thereby strengthen the field of the alternator C connected to rings 42 and 44. The exciter 37 is similarly equipped with a main exciter field 51, battery 52 and differential field 53 which perform the same functions and operate in exactly the same manner as do the corresponding parts 45, 47 and 50 above described. The differential field 53 is connected across the slip rings 43 and 44. The battery 52 is connected in shunt with the field of the exciter 37 through the resistors 54 and 55 and the main field 51 is connected to the battery 52 through the resistor 56, for the same purpose and in the same manner as resistors 48, 49 and 46.

It will therefore be understood that upon failure of voltage on either winding of the rotor of alternator C, the voltage on the other winding will be increased and full load operation can be maintained, although at a higher power factor than when both windings are simultaneously operated at proper voltage. Therefore, in case of a short circuit, open circuit or ground in one of the windings of a generator field, the generator may be kept in circuit excited from the other field winding until such time as repairs can be made.

It will appear to those skilled in the art that a known type of shaft end exciter heretofore used to carry the entire excitation load of one machine, may in accordance with my invention be utilized with the same degree of reliability on a generator twice as large as heretofore possible, with another source of excitation such as the busses 15 and 16.

My invention accordingly provides against forced generator shut-down due to a fault in the rotor winding; ensures immunity from generator "falling out of step" due to accidental failure of an exciter or field circuit; divides the excitation between two sources of direct current, allowing either source to be taken out of service instantly without shutting down the generator; makes possible the use of a larger number of smaller machines and hence less reserve capacity; and permits reduction of the size of the shaft end exciter on large generators to obtain the advantage of the greater reliability of a smaller capacity high speed direct current machine.

Having thus described my invention, what I claim is:

1. Apparatus of the character described comprising a plurality of generators each including a rotor having two field windings, a source of exciting current for supplying one of said field windings of all of said generator rotors and a plurality of other independent sources of exciting current each for supplying one of the other field windings of each of said generator rotors.

2. Apparatus of the character described comprising a generator including a rotor having a plurality of field windings, and a plurality of independent sources of exciting current one for supplying each of said field windings, and means for raising the voltage on certain of said field windings upon failure of voltage no another field winding.

3. Apparatus of the character described comprising a plurality of generators each including a rotor having two field windings, means for simultaneously regulating the voltage on one winding of all of said generator rotors, and means for independently regulating the voltage on the other winding of each generator rotor.

4. Apparatus of the character described comprising a generator including a rotor having a plurality of field windings, and a plurality of independent sources of exciting current one for supplying each of said field windings, a resistor associated with each of said sources of exciting current so as to be capable of varying the voltage of the field with which it is associated, and a normally open circuit relay for short circuiting each of said resistors, each of said relays being connected in another exciting circuit than that of the resistor controlled by the relay.

5. Apparatus of the character described comprising a generator including a rotor having a plurality of field windings, and a plurality of independent sources of exciting current one for supplying each of said field windings, a resistor associated with each of said sources of exciting current so as to be capable of varying the voltage of the field with which it is associated and including a section of fixed resistance and another section of variable resistance, and a normally open circuit relay for short circuiting the fixed resistance of each of said resistances, said relays being connected in another exciting circuit than that of the resistor controlled by said relay.

6. Apparatus of the character described comprising a generator including a rotor having a plurality of field windings, and a plurality of independent sources of exciting current one for supplying each of said field windings, a resistance associated with each of said sources of exciting current so as to be capable of varying the voltage of the field with which it is associated, and means varying one of said resistances upon failure of voltage on one of said field windings to raise the voltage on another field winding.

7. A generator rotor having two separately insulated field windings, each comprising two coil sections diametrically oppositely arranged on the rotor, and a pair of slip rings for each winding, one ring of each pair being connected to each terminal of its corresponding winding.

8. Apparatus of the character described comprising a plurality of generators each including a rotor having two field windings, a source of exciting current for supplying one of said field windings of all of said generator rotors including a direct current generator and busses to which all of the first mentioned field windings are connected, and a direct current generator directly connected to the shaft of each of said generator rotors for supplying exciting current to the other field windings of the respective generator.

9. Apparatus of the character described comprising a plurality of generators each including a rotor having two fields windings, a source of exciting current for supplying one of said field windings of all of said generator rotors including a direct current generator and busses to which all of the first mentioned field windings are connected, a direct current generator directly connected to the shaft of each of said generator rotors for supplying exciting current to the other field windings of the respective generator, and means each controlled by the exciting current of one of said sources for raising the voltage on the field winding supplied by the other source upon failure of voltage on the other field.

FRAZER W. GAY.